United States Patent [19]

Laughlin et al.

[11] 4,184,340

[45] Jan. 22, 1980

[54] TEMPERATURE SENSOR MOUNTING MEANS

[75] Inventors: James P. Laughlin, Evansville, Ind.; Gerald A. Eisenbrandt, Stevensville, Mich.

[73] Assignee: Whirlpool Corporation, Benton Harbor, Mich.

[21] Appl. No.: 848,242

[22] Filed: Nov. 3, 1977

[51] Int. Cl.² ............................................ G01K 13/00
[52] U.S. Cl. ...................................... 62/129; 62/156; 62/158
[58] Field of Search ................. 62/126, 125, 129, 130, 62/156, 158, 208, 229; 165/11 R

[56] References Cited

U.S. PATENT DOCUMENTS

| | | | |
|---|---|---|---|
| 1,672,832 | 5/1928 | Spreen | 62/125 |
| 2,208,272 | 7/1940 | Heintzen | 62/229 |
| 2,280,202 | 4/1942 | Tobey | 62/229 |
| 2,489,906 | 11/1949 | Kahn | 62/130 |
| 2,537,431 | 1/1951 | Stickel | 62/130 |
| 2,741,099 | 4/1956 | Beane | 62/126 |
| 3,013,400 | 12/1961 | Sharpe | 62/156 |
| 3,100,383 | 8/1963 | Foster | 62/130 |
| 3,158,005 | 11/1964 | Jungemann | 62/158 |
| 3,461,834 | 8/1969 | Linder | 62/129 |
| 3,918,269 | 11/1975 | Summers | 62/180 |
| 3,933,120 | 1/1976 | Oltis | 62/125 |

Primary Examiner—James A. Leppink
Assistant Examiner—Henry E. Raduazo
Attorney, Agent, or Firm—Wegner, Stellman, McCord, Wiles & Wood

[57] ABSTRACT

A sensing device for use in a control for an alarm indicating an undesirable operating temperature condition within a refrigeration apparatus cabinet. The sensing device is mounted to have at least one surface thereof in thermal association with a liner portion of the refrigeration apparatus cabinet defining a refrigeration chamber therein. The sensing device is further responsive to the temperature of the refrigerated air within the chamber. The sensing device incorporates a time delay in responding to temperature changes within the refrigerated chamber to avoid false operation of the alarm. The device may be mounted in an insulating housing to provide a further time delay in the air temperature sensing functioning thereof.

18 Claims, 4 Drawing Figures

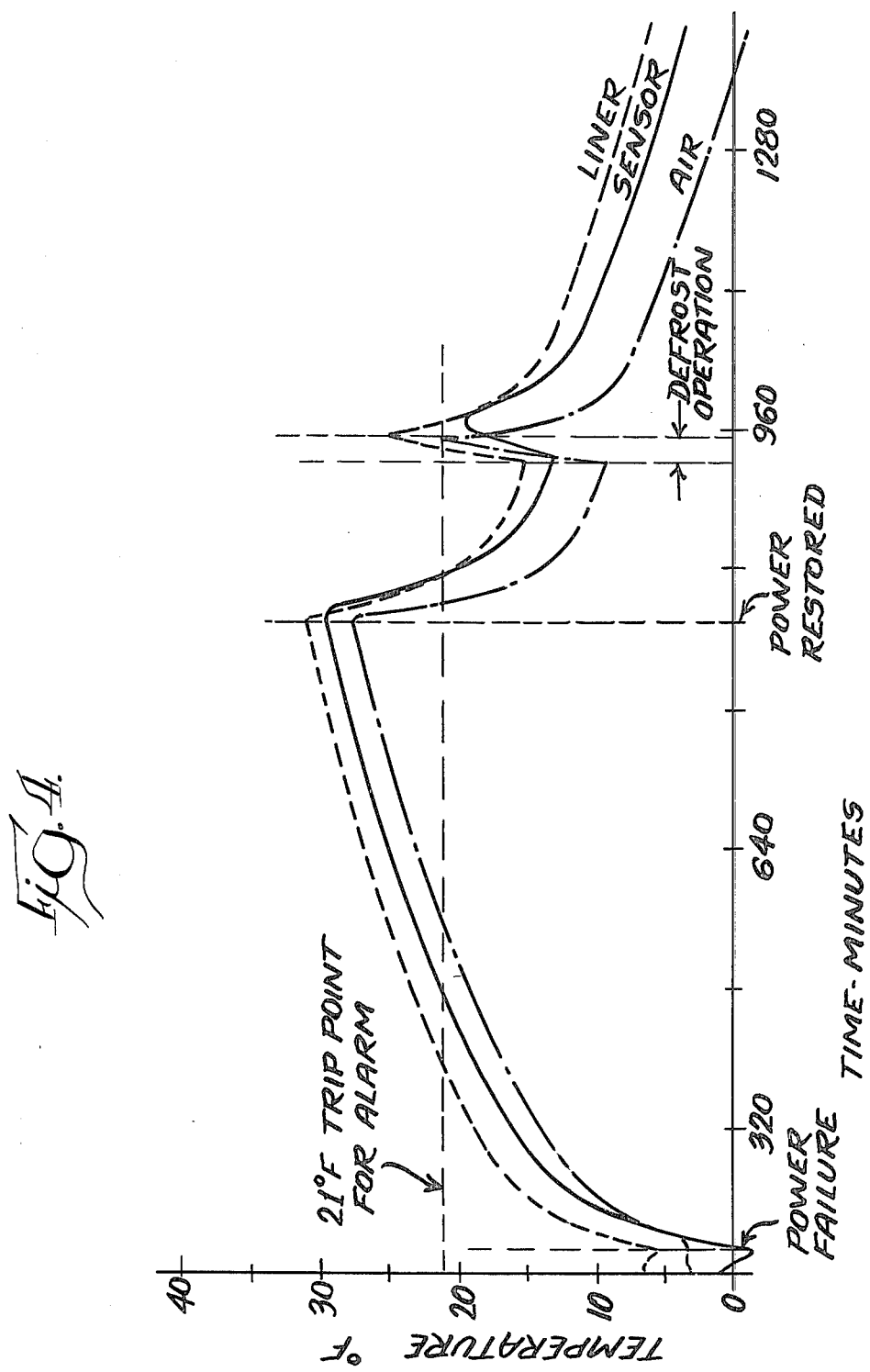

TEMPERATURE SENSOR MOUNTING MEANS

BACKGROUND OF THE INVENTION

1. Field of the Invention

This invention relates to control devices and in particular to means for controlling the alarm of a refrigeration apparatus for indicating an undesirable high temperature condition thereof.

2. Description of the Prior Art

In U.S. Pat. No. 3,158,005, of Luther J. Jungemann, which patent is owned by the assignee hereof, a temperature sensing device is shown to include a sensing bulb embedded in a block of material, such as GRS rubber compound having preselected limited thermal conductivity. In another form, the block is formed of neoprene rubber with metallic powder, such as aluminum or zinc oxide powder, dispersed therein. By controlling the conductivity of the encasing block, the temperature of the sensing bulb is maintained suitably low to prevent false operation of the control until the defrosting operation controlled thereby is completed.

Harry R. Heintzen discloses, in U.S. Pat. No. 2,208,272, a refrigerating apparatus wherein a heat conducting member, or fin, is provided for conducting heat to the sensing bulb at rates varying with the temperature of the atmosphere exteriorly of the refrigeration cabinet. The fin is connected to the main body of the evaporator, or a portion of the evaporator of low mass and of low heat storage capacity, in order that operation of the control may be effected with small heat flow from the shell. The sensing bulb is thusly caused to have a temperature between that of the inner shell of the cabinet and that of the evaporator.

In U.S. Pat. No. 2,280,202, Raymond E. Tobey shows a refrigerating apparatus having a pair of thermostats disposed on opposite sides of an insulating strip within a casing formed of a material having a high thermal conductivity. One of the thermostats is influenced primarily by the temperature of the air within the refrigerated compartment. The other of the thermostats is influenced primarily by the temperature of the air surrounding the refrigeration apparatus and by a portion of the cooling means of the refrigeration apparatus.

A defrost control for refrigerating apparatuses of Verlos G. Sharpe in U.S. Pat. No. 3,013,400, includes a sensing element contained within a chamber having a first surface exposed to the refrigerated air within the cabinet and a second surface exposed to ambient air surrounding the cabinet.

In U.S. Pat. No. 3,461,834, Howard P. Linder shows a freezer thaw alarm wherein a clip is provided for securing the sensor against an interior cabinet wall. The sensor housing is metallic.

Paul E. Summers et al show a temperature and air flow controlling apparatus in a household refrigerator, in U.S. Pat. No. 3,918,269, wherein the controlling thermostat is mounted in the above-freezing compartment on a sidewall portion thereof adjacent the cold air outlet of the evaporator.

In copending application Ser. No. 848,241 of Otfried Heybey, filed Nov. 3, 1977, which application is owned by the assignee hereof, an improved encapsulation means for providing a predetermined time delay to an embedded temperature sensing means therein is disclosed. The present invention is concerned with an improved means for mounting such an encapsulated temperature sensing means.

SUMMARY OF THE INVENTION

The present invention comprehends an improved refrigeration apparatus having an insulated cabinet having refrigerated air therein, an inner liner, alarm means for indicating an undesirable operating temperature within the cabinet, temperature sensing means electrically connected to the alarm means, encapsulating means encasing the temperature sensing means and defining a first outer surface and a second outer surface, and mounting means for mounting the encased temperature sensing means to dispose the first surface in thermal association with the liner. More specifically, the invention comprehends such an apparatus wherein the encapsulated sensing means is mounted so as to define a first heat transfer relationship with the liner and a second heat transfer relationship with the refrigerated air within the cabinet.

Still further, the invention comprehends the provision, in a refrigeration apparatus having a wall having an inner portion defining a refrigerated compartment, of an improved means for sensing an undesirable temperature condition of the compartment wherein the sensing means includes a temperature sensor, a body of synthetic resin material, the sensor being embedded within the body, and mounting means disposing the body to be in direct thermal transfer association with the wall and to have limited thermal transfer association with air within the compartment.

In the illustrated embodiment, the mounting means comprises a housing partially enclosing the encapsulating body. The housing may be formed of a thermally insulating material.

Means may be provided for biasing the body against the cabinet wall, and in the illustrated embodiment, resilient foam tape means are employed for this purpose.

Further in the illustrated embodiment, the body is caused to have a substantially greater thermal transfer with the wall than with the air in the compartment.

The sensor and the body are cooperatively arranged to provide a signal indicating an undesirable high temperature condition of the cabinet liner notwithstanding a maintained satisfactory low temperature condition of the air within the compartment.

In the illustrated embodiment, a limited flow of refrigerated air is permitted to impinge on the second surface of the encapsulating body.

In one form, a portion of the second surface of the encapsulating body is directly exposed to the refrigerated air within the cabinet.

The refrigeration apparatus sensing means of the present invention is extremely simple and economical of construction while yet providing improved functioning and control of the operation of the apparatus as a function of different temperature conditions obtaining therein.

BRIEF DESCRIPTION OF THE DRAWING

Other features and advantages of the invention will be apparent from the following description taken in connection with the accompanying drawing wherein:

FIG. 4 is a graph illustrating the changes in the temperature of the liner, sensing means, and compartment air over a period of approximately 12 hours in the operation of the refrigeration apparatus in conjunction with control of the alarm means thereof.

DESCRIPTION OF THE PREFERRED EMBODIMENT

Figure 1:
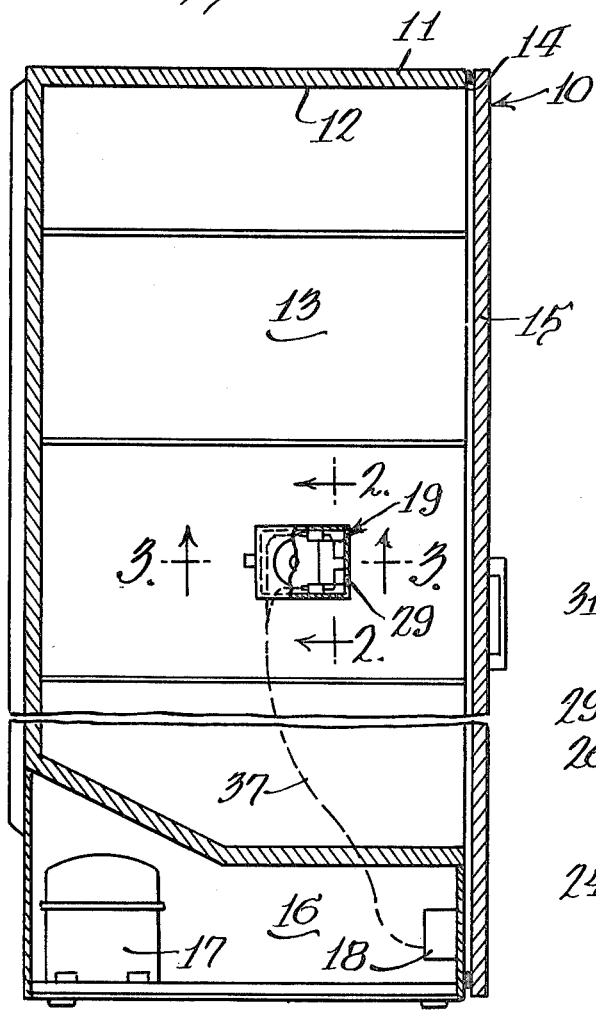
FIG. 1 is a fragmentary vertical section of a refrigeration apparatus having a sensing means embodying the invention installed therein.

In the exemplary embodiment of the invention as disclosed in the drawing, a refrigeration apparatus generally designated 10 is shown to comprise a cabinet 11 having an inner wall portion, or liner, 12 defining a refrigerated compartment 13 provided with a front opening 14 selectively closed by a door 15. The lower portion of the cabinet defines a machinery space 16 in which the refrigeration apparatus, such as the motor-compressor 17, etc., are mounted.

In the illustrated embodiment, an alarm 18 is mounted in the machinery space 16 for providing an indication to the user of the refrigeration apparatus of an undesirable operating condition within the compartment 13, such as a high temperature condition therein.

The sensing means herein comprises an alarm control generally designated 19 which is responsive to the temperature of the liner 12 as well as to the air within the compartment 13. The control 19 is electrically connected to the alarm 18 by means of an electrical cable 37, as illustrated by the dashed lines in FIG. 1.

Figure 2:
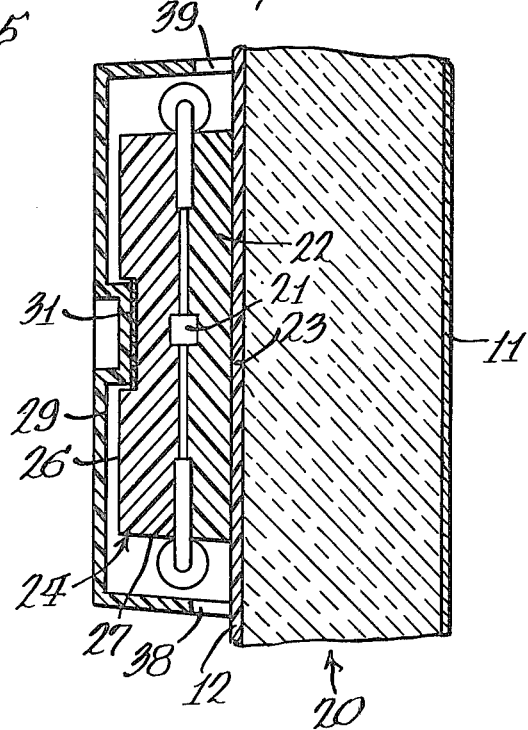
FIG. 2 is a fragmentary enlarged vertical section taken substantially along the line 2—2 of FIG. 1.

In the illustrated embodiment, the control 19 is mounted on the right sidewall 20 of the cabinet. As best seen in FIG. 2, the control includes a temperature sensing element 21 embedded in an encapsulating means 22 comprising a body of synthetic resin material having a first, outer surface 23 abutting the liner 12, and a second, outer surface portion generally designated 24, which is not in abutment with the liner 12. Outer surface portion 24 comprises a number of individual surface portions 25–28 which are either directly or indirectly exposed to the refrigerated air within the compartment 13. As seen with reference to FIGS. 2 and 3, a housing 29 includes a wall portion 30 which is interposed between outer surface portion 25 of the body 22 and the refrigerated air within the compartment. The housing 29 closely overlies outer surface portion 26 but is spaced considerably from outer surface portion 27. Housing 29 is provided with a series of openings, such as those illustrated at 38, 39, which allow refrigerated air to circulate underneath the housing 29. Hence, refrigerated air can flow in direct contact with outer surfaces 27 and 28 of body 22, and, due to the proximity of housing 29, in more limited association with outer surface 26.

The housing is preferably formed of a synthetic resin material having relatively low heat conductivity and, thus, the wall portion 30 tends to insulate the surface portion 25 of the encapsulating body 22 from the refrigerated air.

Thus, the encapsulating body includes first surface 23 in thermal transfer contact with the liner 12, and a complex, second surface portion 24 comprising surface portions 25–28 having various degrees of thermal transfer association with the air within space 13.

As set forth in the above-mentioned application of Otfried Heybey, the body 22 is constructed of a material having a thermal conductivity, heat capacity and thermal diffusivity which are preselected to introduce a time delay in the response of the sensing element 21 to temperature changes at the outer surfaces of body 22. This time delay in the response of sensing means 21 is desirable because it helps prevent false triggering of the alarm as a result of normal short-term temperature variations such as occur when the refrigeration apparatus is going through an automatic defrosting operation.

By way of example, the body 22 may be formed of high-impact polystyrene.

Figure 3:
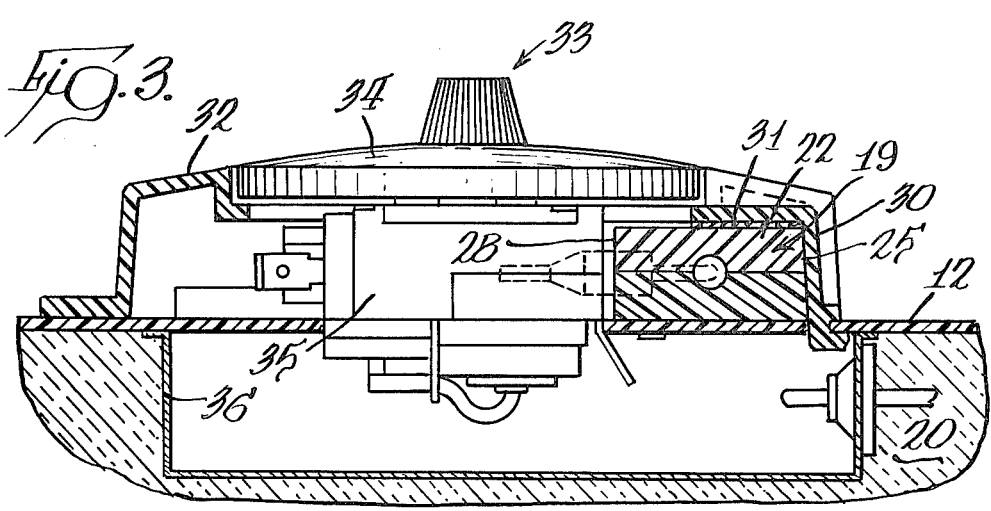
FIG. 3 is a fragmentary enlarged horizontal section taken substantially along the line 3—3 of FIG. 1.

In the illustrated embodiment, as best seen in FIGS. 2 and 3, body 22 is biased against the liner 12 by a resilient foam tape 31 which may be interposed between the housing 24 and the body. In the illustrated embodiment, the tape 31 may comprise a resilient foam tape.

In the illustrated embodiment, control 19 is spaced within sufficient proximity of the front opening 14 of the cabinet so as to detect a condition wherein the door 15 is ajar thereby causing an elevated temperature of the liner to extend rearwardly from the front opening toward the rear of the cabinet. Thus, the control 19 effects an operation of alarm 18 as a result of such a door-open condition notwithstanding the normal operation of the evaporator fan or other refrigerating means of the apparatus to maintain the air in cabinet 13 at or near the desired low level.

In the illustrated embodiment, the refrigeration apparatus comprises a vertical freezer and the liner is a conventional metallic liner. By way of example, the liner may be fabricated of steel having a thickness of approximately 0.024 inches.

Due to its mass, heat capacity and thermal conductivity, the liner does not change temperature rapidly and tends to attain a temperature which represents somewhat of an average of the temperature extremes existing within the refrigerated compartment 13. The temperature of the liner is also affected by the temperature of the ambient air exterior of the refrigeration apparatus, with the result that the liner temperature is normally slightly higher than the temperature of the air within the refrigerated compartment, as illustrated in FIG. 4. The present invention takes advantage of the temperature characteristics of the liner by placing the body 22 in good thermal transfer association with the liner such that the sensing means 21 is primarily responsive to the liner temperature. As a result of this placement, the sensing means is rendered relatively insensitive to the manner in which air flows or distributes itself within the refrigerated compartment, although the sensing means is still somewhat responsive to the refrigerated air. This provides an advantage in that the arrangement or loading of articles within the freezer will have a negligible effect on the operation of the sensing means even though air flow within the freezer may be greatly affected.

Various prior art sensing devices respond to the temperature of the refrigerated air within the freezer. The location of such devices is relatively critical because the device is then affected by the amount of air flow which, as indicated above, may vary widely as the result of different loading arrangements in the freezer.

Another problem encountered with the conventional sensing devices is the layering of the air during periods when the evaporator fan has cycled off. During such periods the warmest portion of the air within the compartment collects in the upper portion of the compartment while the coldest portion thereof falls to the lower portion of the compartment. Such a temperature gradient produces a considerable temperature differential within the refrigerated space, thereby again requiring critical location of the sensing means of the conventional type.

The need for a time delay control further is caused by the normal cycling of the refrigeration apparatus including the operation of the evaporator and compressor, as well as in the temperature fluctuations caused in the refrigerated compartment by the periodic access of the user to the compartment and as by the operation of automatic defrosting means in the normal functioning of the refrigeration apparatus.

The control 19 provides an improved sensing operation as a result of the arrangement thereof with a substantial portion of the surface of the encapsulating body 22 in direct thermal transfer association with the liner 12. A second surface area is exposed to the refrigerated air within the compartment. By forming the housing of an insulating material and covering a portion of the second surface with the housing, the thermal transfer association with the refrigerated air is made less direct than that with the liner.

In the illustrated embodiment, the control 19 is fitted into the main housing 32 of the thermostat control 33 of the refrigeration apparatus. Openings 38, 39 in the side walls of the housing 32 permit refrigerated air to flow in direct thermal association with all portions of the thermostat control 33. Body 22 may be snap-fitted in the housing portion 26 so as to provide a firm, positive mounting of the control in the thermostat means. As the body 22 is somewhat recessed and shielded within the housing 32, the control of the operation of the sensor 21 is, to a considerable extent, determined by the temperature of the liner 12 so as to provide the desired relative insensitivity of the sensor 21 to temperature fluctuations in the air flow.

As shown in FIG. 3, the thermostat includes a control knob 34 of conventional construction, and further includes a thermostat switch 35 mounted within the housing 32 and projecting to within a well 36 in the cabinet wall 20.

Referring now to FIG. 4, the relationship between the temperature of sensing means 21 and the temperature of the refrigerated air and the temperature of the liner is illustrated for various modes of operation of the refrigeration apparatus. Generally, for steady-state or slowly changing temperature conditions, the temperature of the sensing means 21 falls between the air temperature and the liner temperature. During periods when the temperature of the refrigerated air is gradually increasing, such as after a power failure, the temperature of the sensing means lags the liner temperature and leads the air temperature. This is illustrated by the left-hand portion of FIG. 4. During periods when the temperature of the refrigerated air is gradually decreasing, such as after a defrost operation or after power has been restored following a power failure, the temperature of the sensing means 21 lags the air temperature and leads the liner temperature. This is illustrated by the right-hand portion of FIG. 4.

An important aspect of the present invention is that during short-term, high-amplitude fluctuations of the temperature within the refrigerated compartment 13, the temperature of the sensing means 21 lags both the liner temperature and the air temperature. This permits the alarm mechanism to ignore such temperature changes as are due to an automatic defrosting operation or the opening of the door of the refrigeration apparatus 10 for loading. As illustrated in FIG. 4, due to this temperature lag, the temperature of the sensing means 21 remains well below that of both the liner and the refrigerated air during the relatively brief period of a defrosting operation. This permits the use of a lower trip point for the alarm than would be possible with conventional sensing means. Hence, as illustrated in FIG. 4, a trip point of 21° F. may be employed even though the temperature of the refrigerated air and the temperature of the liner rise above this level during a defrosting operation. The use of a 21° F. trip point allows the alarm 18 to signal a power failure long before the temperature within compartment 13 reaches 32° F. at which thawing of the food load will occur.

As seen most clearly in the right-hand portion of FIG. 4, during normal operation of the refrigeration apparatus the temperature of sensing means 21 is closer to that of the liner than that of the air. This is due to the fact that the sensing means 21 is disposed to have a greater heat transfer relationship with the liner 12 than with the air within compartment 13. Such an arrangement is desirable in the illustrated embodiment because the liner temperature lags the air temperature during a defrosting operation and leads the air temperature during a power failure. It is, however, desirable to have the sensing means 21 also responsive to the air within the compartment 13 because this enables a more rapid recovery and prevents overshoot of the sensing means 21 whenever the refrigeration apparatus is re-energized following a defrosting operation or a power failure.

As discussed previously, the present invention provides a facilitated sensing arrangement which permits actuation of the alarm 18 in response to temperature conditions arising within the refrigeration apparatus when the door 15 has been left open or ajar for a period of time. Under such a condition, the thermostat 33 may respond to warm air entering the compartment 13 and energize the refrigeration means including an evaporator fan (not shown). Notwithstanding the circulation of below-freezing air by the evaporator fan, the temperature of the liner 12 will increase as a result of the front portion of the liner being exposed to warm ambient air. Since the liner is formed of a material having a good thermal conductivity the temperature increase will tend to spread throughout the extent of the liner, thereby exposing surface 23 of body 22 to an increased temperature. Due to the mass of the liner 12 and the time delay interposed by body 22, a desirable time delay in the response of sensing means 21 is provided in sensing a door-open condition.

Thus, the present invention provides an improved sensing function for a refrigeration apparatus alarm by means of an improved mounting arrangement for an encapsulated sensing means. The mounting arrangement incorporates a common housing for a conventional thermostat and the encapsulated sensing means, disposing the thermostat in direct thermal association with the refrigerated air while disposing the encapsulated sensing means in thermal association with the apparatus liner and the refrigerated air in a manner which provides for facilitated sensing of undesirable operating conditions within the refrigeration apparatus.

The foregoing disclosure of a specific embodiment is illustrative of the broad inventive concepts comprehended by the invention.

Having described the invention, the embodiments of the invention in which an exclusive property or privilege is claimed are defined as follows:

1. In a refrigeration apparatus having an insulated cabinet provided with an inner liner, refrigeration means for refrigerating the air within said cabinet, and alarm means for indicating an undesirable operating temperature within said cabinet, improved sensing means for controlling operation of said alarm means comprising:

temperature sensing means electrically connected to said alarm means;

encapsulation means encasing said temperature sensing means and effecting a predetermined time delay in the thermal response of said sensing means; and mounting means for mounting said encased temperature sensing means to dispose said sensing means in a first heat transfer relationship with said liner at a location whereat the liner temperature represents substantially an average of the temperature conditions within said cabinet, and in a second heat transfer relationship with said refrigerated air within said cabinet, said encapsulating means and mounting means being cooperatively associated to cause said first heat transfer relationship to provide greater heat transfer to said temperature sensing means than said second heat transfer relationship and effecting a second time delay in the thermal response of said sensing means.

2. The refrigeration apparatus of claim 1 wherein said encapsulation means includes a first surface portion disposed by said mounting means to be in contact with a portion of said liner, thereby defining said first heat transfer relationship.

3. The refrigeration apparatus of claim 2 wherein said mounting means includes a portion of low thermal conductivity interposed between a second surface portion of said encapsulation means and said refrigerated air within the cabinet, thereby defining said second heat transfer relationship.

4. The refrigeration apparatus of claim 3 wherein said encapsulation means further includes a second surface portion directly exposed to said refrigerated air within the cabinet, thereby further defining said second heat transfer relationship.

5. The refrigeration apparatus of claim 1 wherein the thermal conductivity of said liner is sufficiently high that said liner tends to achieve a single temperature throughout its extent.

6. The refrigeration apparatus of claim 1 wherein said liner includes top, bottom and side wall members which define a front peripheral edge, said mounting means disposing said encased temperature sensing means on the mid portion of one of said side wall members in spaced but adjacent relationship to said front peripheral edge.

7. In a refrigeration apparatus having an insulated cabinet provided with an inner liner defining a refrigerated compartment, refrigeration means for refrigerating the air within said compartment, temperature sensing means, and alarm means connected to said temperature sensing means for causing said alarm means to indicate an undesirable operating temperature within said compartment, an improved mounting means for said temperature sensing means in said cabinet comprising:

encapsulation means encasing said temperature sensing means and adding a predetermined time delay in the transfer of thermal energy to said sensing means, said encapsulation means defining at least a first outer surface and a second outer surface; and mounting means formed of a low thermal conductivity material maintaining said first surface in direct contact with said liner at a location whereat the liner temperature represents substantially an average of the temperature conditions within said compartment to have direct thermal transfer association therewith for providing a primary temperature sensing operation of the sensing means.

8. The refrigeration apparatus of claim 7 wherein said mounting means extends between at least a portion of said second outer surface of the encapsulation means and the refrigerated air within said compartment thereby preventing direct thermal transfer association between said air and said second surface portion.

9. The refrigeration apparatus of claim 7 wherein said mounting means is arranged to permit a limited flow of said refrigerated air against said second outer surface.

10. In a refrigeration apparatus having a wall having an inner portion defining a refrigerated compartment, an improved means for sensing a temperature condition of the compartment comprising:

a temperature sensor;

a body of synthetic resin material having a mass substantially larger than the mass of said sensor, said sensor being embedded within said body; and mounting means disposing said body to be in direct thermal transfer association with said wall inner portion at a location whereat the liner temperature represents substantially an average of the temperature conditions within said compartment to have primary thermal transfer association with said wall inner portion and to have limited thermal transfer association with air within the compartment.

11. The refrigeration apparatus of claim 10 wherein said mounting means comprises a housing formed of a thermally insulating material partially enclosing said body.

12. The refrigeration apparatus of claim 10 wherein resilient tape means are provided between said housing and said body for biasing said body against said wall inner portion.

13. The refrigeration apparatus of claim 10 wherein said wall inner portion is formed of a material having a good thermal conductivity and wherein said wall inner portion has a mass substantially larger than that of said body.

14. The refrigeration apparatus of claim 10 wherein said sensor and body are cooperatively arranged to provide a warning signal indicating an undesirable high temperature condition of said wall inner portion notwithstanding a maintained satisfactory low temperature condition of the air within said compartment.

15. In a refrigeration apparatus having an insulated cabinet provided with an inner liner defining a refrigerated compartment, refrigeration means for refrigerating the air within said compartment, first temperature sensing means for sensing the temperature of air within said compartment and controlling the operation of said refrigeration means, second temperature sensing means and alarm means connected to said second temperature sensing means for causing said alarm means to indicate an undesirable operating temperature condition within said compartment, an improved mounting means for said first and second temperature sensing means comprising:

a housing formed of a low thermal conductivity material and mounted on said liner, said housing including first mounting means for mounting said first temperature sensing means in direct thermal association with the refrigerated air within said compartment and second mounting means for mounting said second temperature sensing means in a first heat transfer relationship with said liner at a location whereat the liner temperature represents substantially an average of the temperature conditions within said compartment, and a second heat transfer relationship with said refrigerated air, said second mounting means being constructed to cause said first heat transfer relationship to provide greater heat transfer than said second heat transfer relationship.

16. The refrigeration apparatus of claim 15 wherein said second temperature sensing means is encapsulated to cause a predetermined time delay in the thermal response of said second temperature sensing means.

17. The refrigeration apparatus of claim 16 wherein said encapsulated sensing means includes first and second surfaces, said first surface being disposed in contact with said liner to thereby define said first heat transfer relationship and said second surface having a portion thereof covered by said housing to thereby define said second heat transfer relationship.

18. In a refrigeration apparatus having a wall having an inner portion defining a refrigerated compartment, an improved means for sensing a temperature condition of the compartment comprising:
 a temperature sensor;
 encapsulation means encasing said temperature sensor and defining a first surface portion and a second surface portion; and
 mounting means for mounting said encapsulated sensor with said first surface portion in thermal transfer association with said wall inner portion at a location whereat the liner temperature represents substantially an average of the temperature conditions within said compartment, and said second surface portion in thermal transfer association with the air within said refrigerated compartment to cause the primary heat transfer to be between the sensor and said wall inner portion.

* * * * *